US010802236B2

(12) United States Patent
Kowalczyk et al.

(10) Patent No.: US 10,802,236 B2
(45) Date of Patent: Oct. 13, 2020

(54) FIBER OPTIC ENCLOSURE FOR RETROFITTING PEDESTALS IN THE FIELD

(71) Applicant: CommScope Technologies LLC, Hickory, NC (US)

(72) Inventors: Scott C. Kowalczyk, Savage, MN (US); Rodney C. Schoenfelder, Shakopee, MN (US); John D. Moser, Wylie, TX (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/966,216

(22) Filed: Apr. 30, 2018

(65) Prior Publication Data

US 2020/0124809 A1     Apr. 23, 2020

Related U.S. Application Data (63) Continuation of application No. 15/262,713, filed on Sep. 12, 2016, now Pat. No. 9,958,628, which is a continuation of application No. 14/850,575, filed on Sep. 10, 2015, now Pat. No. 9,442,266.

(60) Provisional application No. 62/049,007, filed on Sep. 11, 2014.

(51) Int. Cl.
*G02B 6/44* (2006.01)
*G02B 6/38* (2006.01)

(52) U.S. Cl.
CPC .......... *G02B 6/445* (2013.01); *G02B 6/3897* (2013.01); *G02B 6/4446* (2013.01); *G02B 6/4452* (2013.01); *G02B 6/4453* (2013.01); *G02B 6/4477* (2013.01)

(58) Field of Classification Search
CPC ..... G02B 6/445; G02B 6/4452; G02B 6/4447
See application file for complete search history.

(56) References Cited

U.S. PATENT DOCUMENTS

| 7,369,741 | B2  | 5/2008  | Reagan et al. |
| 7,400,816 | B2  | 7/2008  | Reagan et al. |
| 7,409,138 | B1* | 8/2008  | Frazier ................. G02B 6/445 385/135 |
| 7,471,869 | B2  | 12/2008 | Reagan et al. |
| 7,720,343 | B2  | 5/2010  | Barth et al. |
| 7,809,232 | B2  | 10/2010 | Reagan et al. |
| 7,809,235 | B2  | 10/2010 | Reagan et al. |
| 7,816,602 | B2  | 10/2010 | Landry et al. |
| 7,844,161 | B2  | 11/2010 | Reagan et al. |
| 7,873,255 | B2  | 1/2011  | Reagan et al. |

(Continued)

*Primary Examiner* — Omar R Rojas
(74) *Attorney, Agent, or Firm* — Merchant & Gould P.C.

(57) ABSTRACT

A telecommunications device includes a module that mounts within an interior of a housing. The housing has a door that latches closed. The module includes a module frame having a bulkhead that divides the interior of the housing into first and second regions. Fiber optic adapters are mounted to the bulkhead. First ports of the adapters are accessible at the first region of the housing interior and second ports are accessible at the second region of the housing interior. The module includes a removable cover for restricting access to the first region. The removable cover including a latch catch that interlocks with the door latch to secure the door in the closed position. The module includes a tray mounted to the module frame within the first region of the housing.

17 Claims, 9 Drawing Sheets

(56) References Cited

U.S. PATENT DOCUMENTS

| | | | |
|---|---|---|---|
| 8,107,816 B2* | 1/2012 | Bolster | H04J 14/02 |
| | | | 398/79 |
| 8,121,458 B2 | 2/2012 | Barth et al. | |
| 8,263,861 B2 | 9/2012 | Landry et al. | |
| 8,285,103 B2 | 10/2012 | Reagan et al. | |
| 8,374,476 B2 | 2/2013 | Reagan et al. | |
| 8,569,618 B2 | 10/2013 | Landry et al. | |
| 9,146,372 B2 | 9/2015 | Reagan et al. | |
| 9,146,373 B2 | 9/2015 | Reagan et al. | |
| 9,442,266 B2* | 9/2016 | Kowalczyk | G02B 6/4446 |
| 9,958,628 B2 | 5/2018 | Kowalczyk et al. | |
| 2011/0262095 A1 | 10/2011 | Fabrykowski et al. | |
| 2014/0126870 A1 | 5/2014 | Landry et al. | |
| 2014/0219622 A1 | 8/2014 | Coan et al. | |
| 2015/0338600 A1 | 11/2015 | Reagan et al. | |

* cited by examiner

FIG. 14

FIBER OPTIC ENCLOSURE FOR RETROFITTING PEDESTALS IN THE FIELD

CROSS-REFERENCE TO RELATED APPLICATIONS

This application is a continuation of application Ser. No. 15/262,713, filed Sep. 12, 2016, now U.S. Pat. No. 9,958,628, which is a continuation of application Ser. No. 14/850,575, filed Sep. 10, 2015, now U.S. Pat. No. 9,442,266, which application claims the benefit of provisional application Ser. No. 62/049,007, filed Sep. 11, 2014, and titled "Fiber Optic Enclosure for Retrofitting Pedestals in the Field," which applications are incorporated herein by reference in their entirety.

TECHNICAL FIELD

The present disclosure relates generally to equipment for use in fiber optic networks. More particularly, the present disclosure relates to enclosures suitable for use in fiber optic networks.

BACKGROUND

Fiber optic communication networks are continuously expanding as service providers strive to deliver higher bandwidth communication capabilities to customer. A typical fiber optic communication system includes a network of fiber optic cables suitable for transmitting larger volumes of data and voice signals over relatively long distances. The fiber optic communication systems frequently include components such as enclosures that may house telecommunications equipment such as passive power splitters, wave length division multiplexers, splice trays, fiber optic adapters for interconnecting fiber optic connectors, patch panels, interconnect panels or other components. There is a need for systems, methods and devices for cost effectively expanding fiber optic networks.

Some aspects of the present disclosure relate to telecommunications equipment that can be used to efficiently and cost effectively retrofit pre-existing pedestals in the field such that the pedestals can be used to support the expansion of fiber optic networks. In certain examples, the pedestals can include traditional cable television pedestals such as the TV 80 Series pedestals sold by Emerson Network Power Energy Systems of Warrenville, Ill.

Other aspects of the present disclosure relate to a fiber optic enclosure that is compartmentalized to limit access to certain portions of the closure and that includes a fail-safe latching arrangement that ensures limited access compartments are properly secured during field service installation and over the lifetime of maintenance of the enclosure. Other aspects relates to features that ensure components are not inadvertently lost or misplaced during field service installation and over the lifetime of maintenance of the enclosure.

Further aspects of the present disclosure relate to field-installable enclosures having enhanced connector and adapter access.

Still other aspects of the present disclosure relate to field-installable enclosures having modular components that can be fully assembled prior to installation in the enclosure to enhance efficiency and mitigate risks associated with errors in assembly. Additionally, the use of modular components can also facilitate making upgrades and modifications in a timely manner to meet customer demands.

Still other aspects of the present disclosure relate to an enclosure having readily accessible splice trays that can be stacked one-on-top of the other to provide upgrades or to increase capacity over time.

Another aspect of the present disclosure relates to a telecommunications device including a housing having a door for accessing an interior of the housing. The door is movable between an open position and a closed position. The door includes a door latch for securing the door in the closed position. The telecommunications device also includes a module that mounts within the interior of the housing. The module includes a module frame having a bulkhead that divides the interior of the housing into first and second regions. The module includes a plurality of fiber optic adapters mounted to the bulkhead. The fiber optic adapters include first ports accessible at the first region of the housing interior and second ports accessible at the second region of the housing interior. The module includes a removable cover mountable to the module frame for restricting access to the first region. The removable cover includes a latch catch that interlocks with the door latch to secure the door in the closed position. The module also includes a tray mounted to the module frame within the first region of the housing.

A variety of additional aspects will be set forth in the description that follows. The aspects relate to individual features and to combinations of features. It is to be understood that both the forgoing general description and the following detailed description are exemplary and explanatory only and are not restrictive of the broad inventive concepts upon which the examples disclosed herein are based.

DETAILED DESCRIPTION

Aspects of the present disclosure relate to telecommunications devices such as enclosures that can readily be incorporated into pre-existing cabinets (e.g., outdoor pedestals such as TV 80 Series pedestals) that have been previously installed in the field. Thus, aspects of the present disclosure relate to telecommunications devices suitable for use in expanding fiber optic networks in an efficient manner by utilizing existing equipment that has been previously installed in the field.

Figure 1:
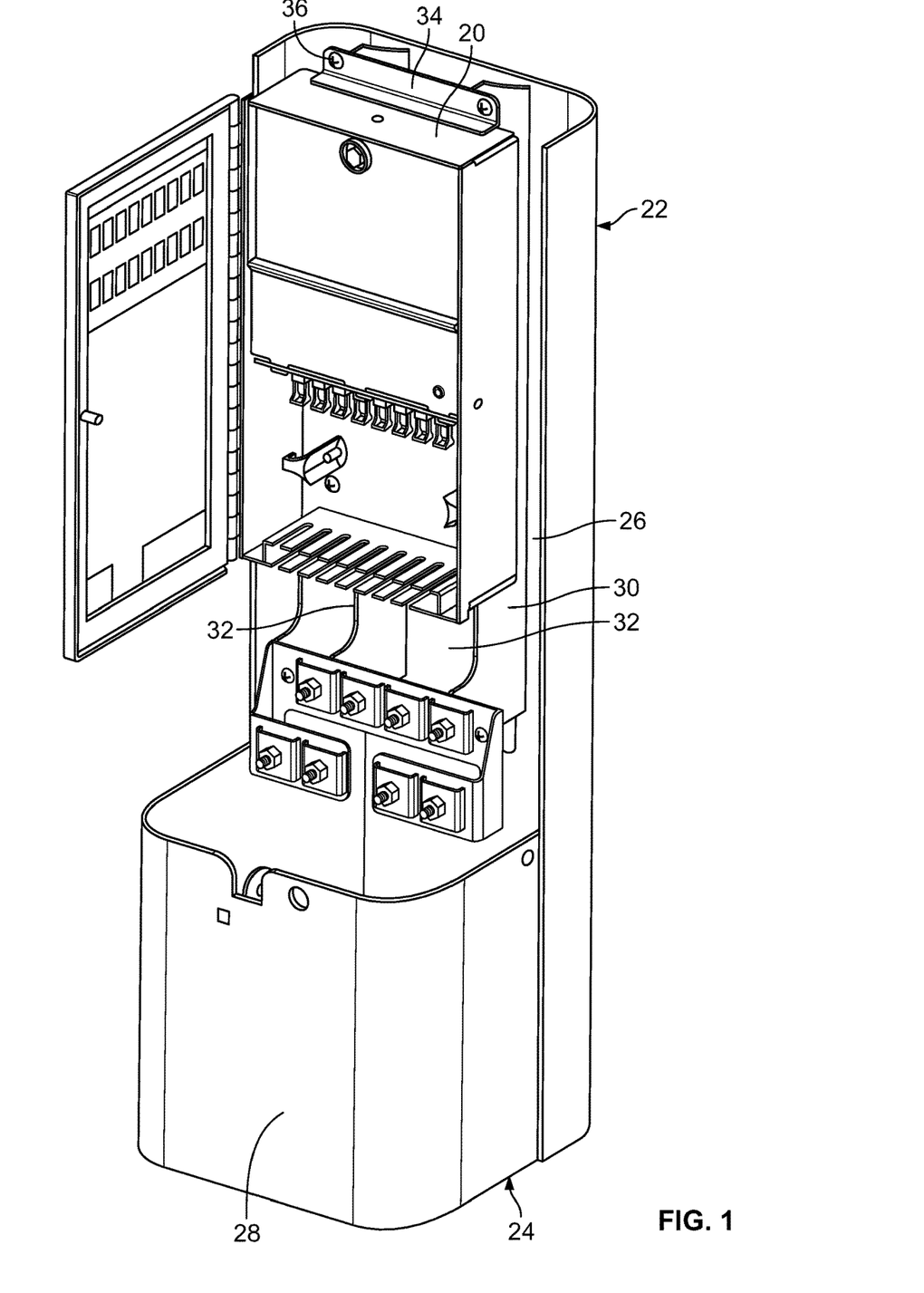
FIG. 1 is a perspective view showing a telecommunications device in accordance with the principles of the present disclosure installed within an outdoor pedestal, a top cover of the pedestal has been removed so that the telecommunications device is visible.

Referring to FIG. 1, a telecommunications device 20 is shown in accordance with the principles of the present disclosure. The telecommunications device 20 is shown mounted within an outdoor cabinet 22. In certain examples, the outdoor cabinet 22 can be a pedestal such as a TV 80 Series cable television pedestal sold by Emerson Network Power Energy Systems of Warrenville, Ill. As depicted, the outdoor cabinet 22 is shown as a pedestal having a base 24. The base 24 includes a back plate 26 and a lower front cover 28. An upper front cover or cap (not shown) mounts over the base 24 to enclose the pedestal. The pedestal is shown equipped with an internal frame 30 including two parallel rails 32. The telecommunications device 20 includes at least one bracket 34 that can be used to attach the telecommunications device 20 to the rails 32 of the internal frame 30 via fasteners 36.

Figure 2:
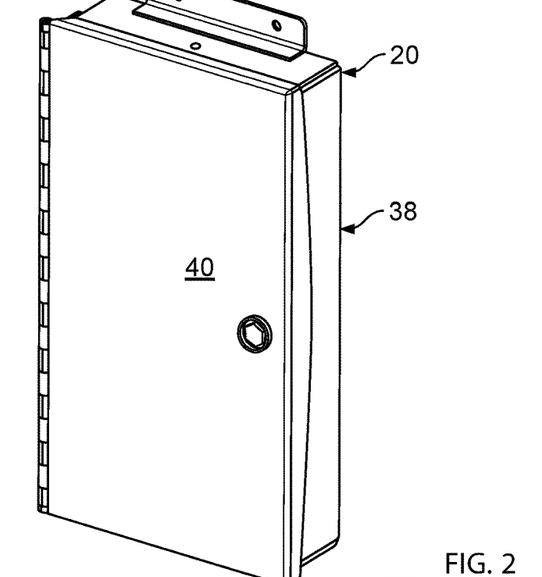
FIG. 2 illustrates the telecommunications device of FIG. 1 in isolation from the pedestal.
Figure 3:
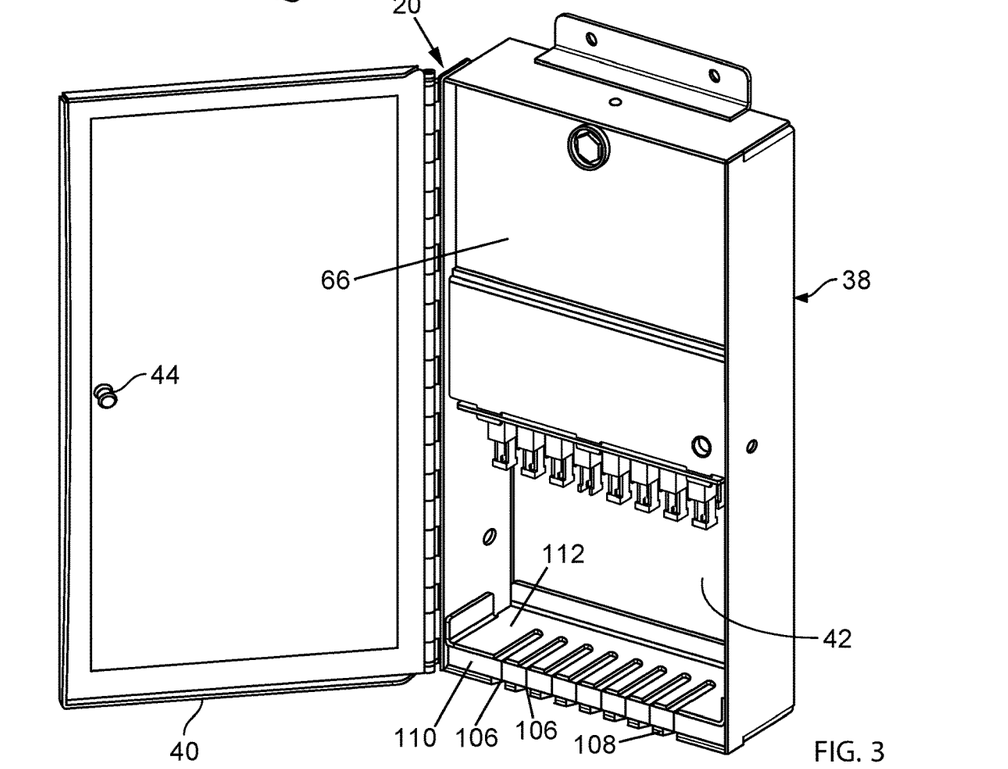
FIG. 3 shows the telecommunications device of FIG. 2 with a front door open.
Figure 4:
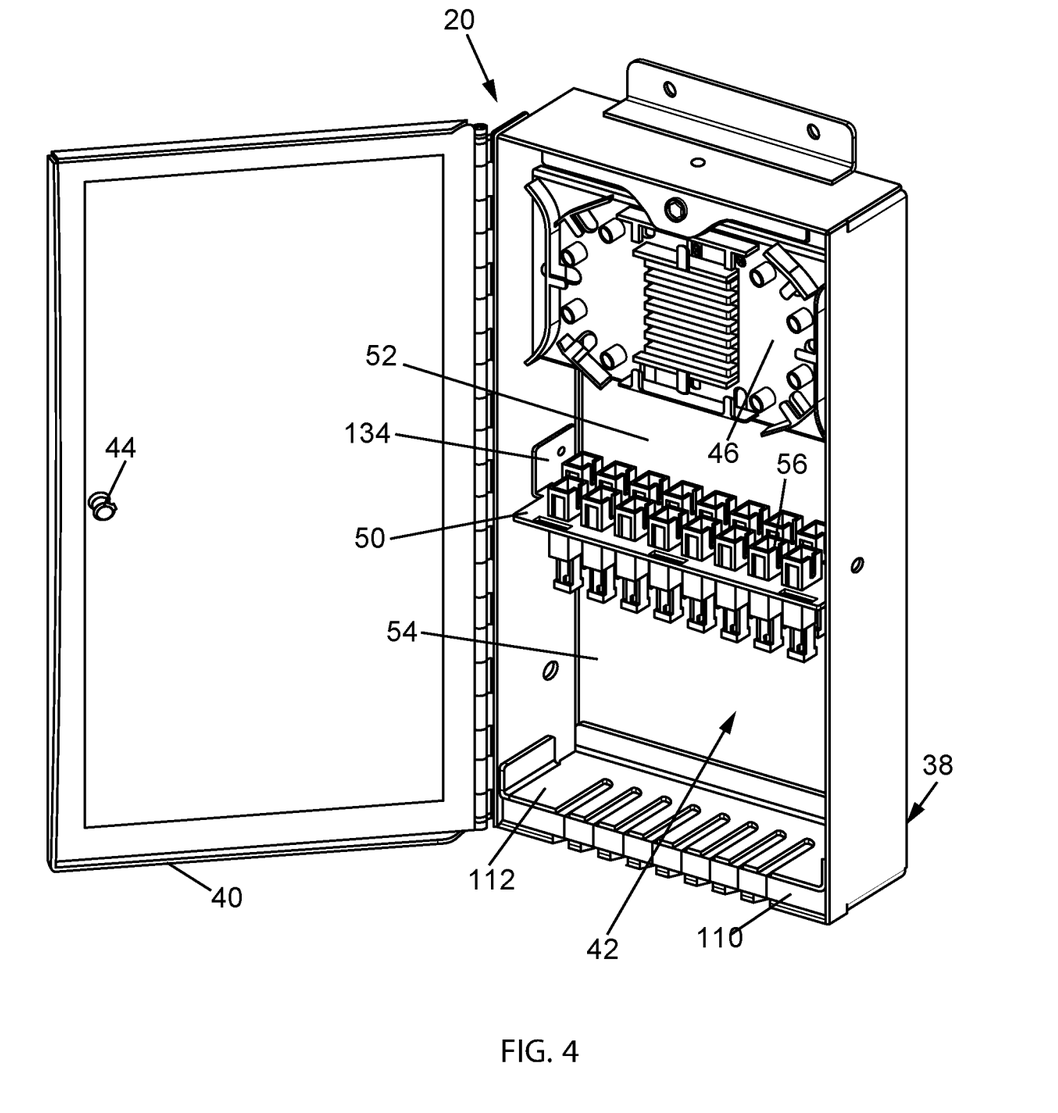
FIG. 4 shows the telecommunications device of FIG. 3 with the front door open and an internal module cover removed.

Referring to FIGS. 2 and 3, the telecommunications device 20 includes a housing 38 having a door 40 for accessing an interior 42 of the housing 38. The door 40 is movable between an open position (see FIG. 3) and a closed position (see FIG. 2). The door 40 includes a door latch 44 for securing the door 40 in the closed position. The door latch 44 can be actuated with a key or a tool such as a wrench or socket. In other examples, the door latch 44 can be manually actuated.

Referring to FIGS. 3-8, the telecommunications device 20 also includes a module 46 that mounts within the interior 42 of the housing 38. The module 46 includes a module frame 48 (see FIG. 7) having a bulkhead 50 that divides the interior 42 of the housing 38 into first and second regions 52, 54 (see FIGS. 4 and 6). The module 46 includes a plurality of fiber optic adapters 56 mounted to the bulkhead 50. In one example, the fiber optic adapters 56 are snapped within corresponding openings 58 defined by the bulkhead 50 (see FIG. 8). The fiber optic adapters 56 include first ports 60 accessible at the first region 52 of the housing interior 42 and second ports 62 accessible at the second region 54 of the housing interior 42 (see FIG. 6). When not in use, the ports 60, 62 can be closed and protected by removable dust caps 64.

Figure 5:
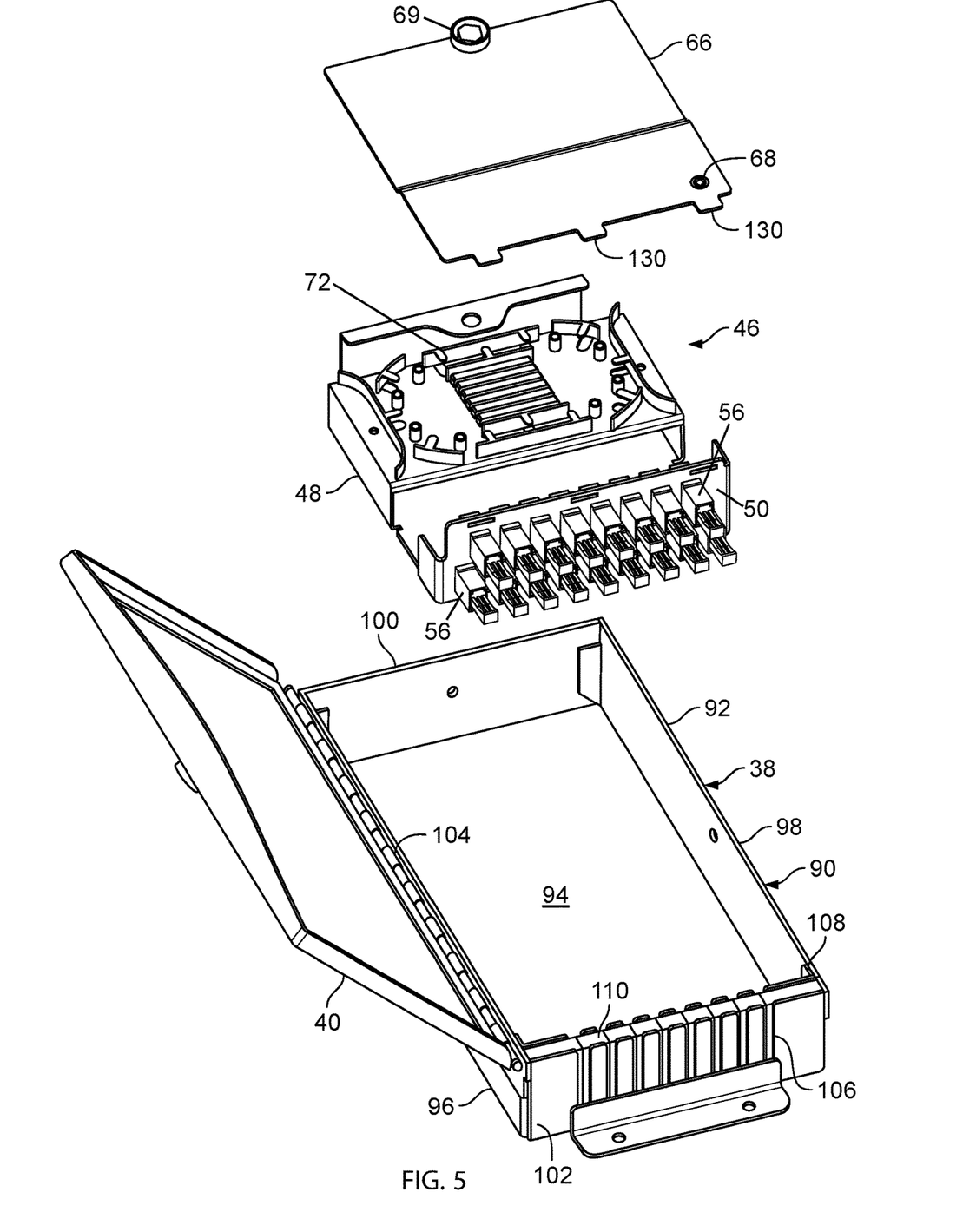
FIG. 5 is an exploded view of the telecommunications device of FIGS. 2-4.
Figures 6, 7:
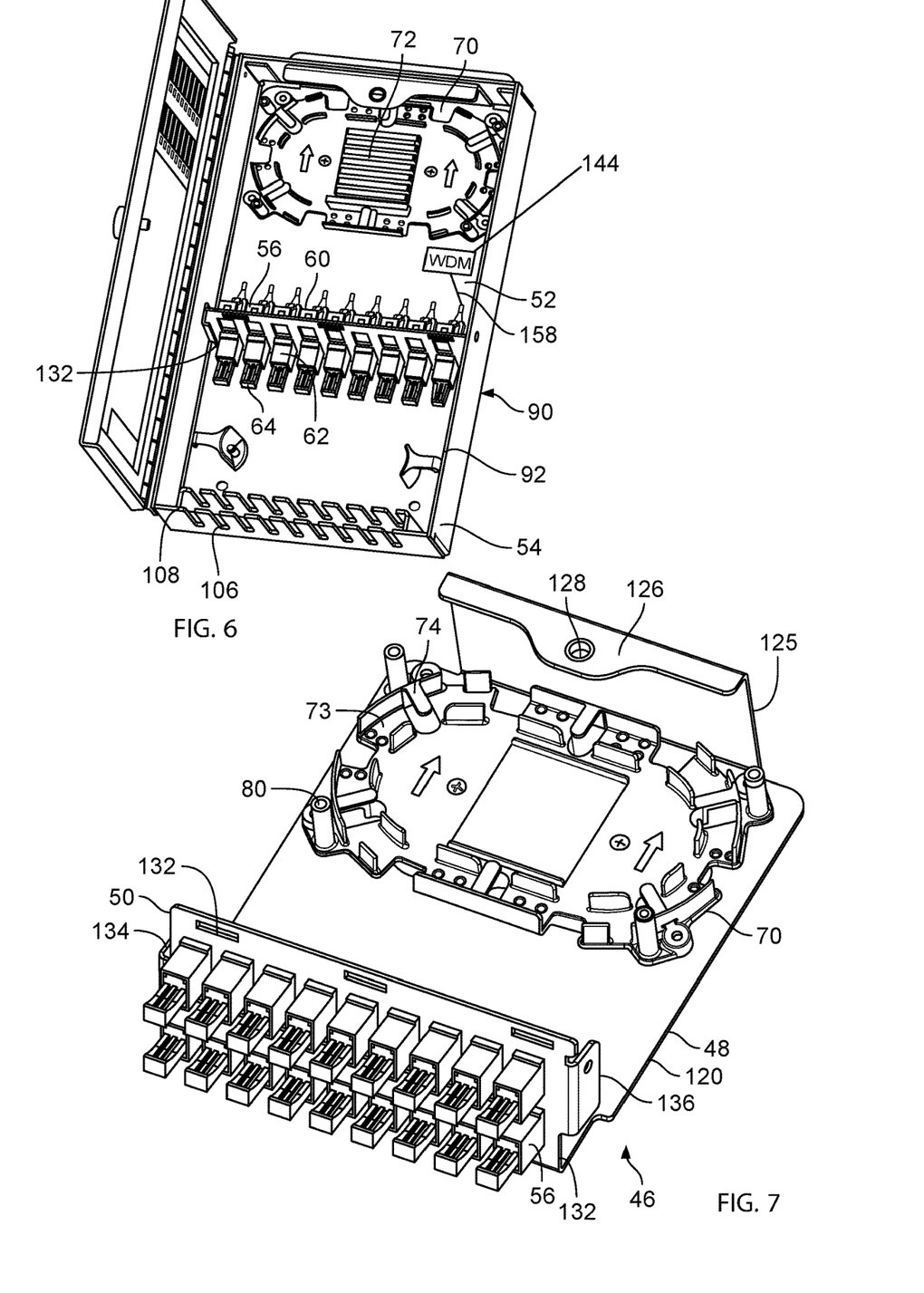
FIG. 6 is another view of the telecommunications device of FIG. 2 with the front door open and the internal module cover removed.
FIG. 7 is a perspective view showing a module of the telecommunications device of FIG. 6 with the module cover removed.

Referring to FIGS. 3 and 5, the module 46 also includes a removable cover 66 that mounts to the module frame 48 for restricting access to the first region 52 of the housing interior 42. The removable cover 66 includes a latch catch 68 that interlocks with the door latch 44 to secure the door 40 in the closed position. In this way, it is necessary for the removable cover 66 to be installed on the module frame 48 within the housing interior 42 for the door latch 44 to be capable of being latched. This feature prevents a field technician from forgetting to install the removable cover 66 before closing and latching the door 40.

By "restricted access", it is meant that it is more difficult and/or time consuming to access the first region 52 than the second region 54. In certain examples, a key or special tool is required to remove the removable cover 66 from the module frame 48. In other examples, a standard tool, such as a wrench or socket, can be used to remove the removable cover 66. In still other examples, the removable cover 66 can be manually removed without the use of a tool or key.

Referring to FIGS. 4-7, the module 46 can also include a tray 70, such as a fiber management tray, that mounts to the module frame 48 and is positioned within the first region 52 of the housing 38. In certain examples, the tray 70 can include structure for holding optical components such as splices, passive optical power splitters, wavelength division multiplexers or other components. The structures 72 can be mounted at a central region on a top side of the tray 70. The top side of the tray can also include elongated fiber management pathways defined by channels that can be arranged in elongated oval configurations, racetrack configurations or other configurations for routing optical fibers in continuous loops. Tabs 74 can be used to contain optical fibers within the channels 73. One or more openings 75 can be defined through the tray for routing optical fibers and optical cables between the top and bottom sides of the tray. The tray 70 further includes corner posts 80 for facilitating stacking multiple trays one-on-top of the other. When stacked, the upper ends of the posts can nest within corresponding receptacles defined by the undersides of the trays. The bottom side of the tray can further include an elongated continuous pathway defined by a wall 84. The wall defines opposite elongated sides and curved ends. In use, fiber optic cables can be wrapped around the bottom structure to provide strain relief. In certain examples, tie wraps or other structures can be used to secure fiber optic cables to the tray. The stacked trays 70 can have identical configurations but can be rotated 180 degrees relative to one another so that the posts of the bottom tray align with the receptacles of the top tray. Fasteners can be inserted through openings defined in the receptacles and threaded into the corresponding posts to secure the stacked trays together.

Figure 11:
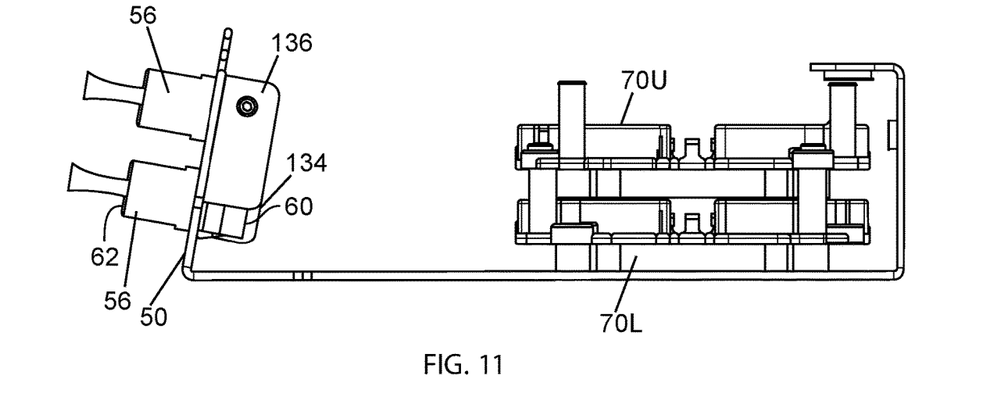
FIG. 11 is a side view of the module of FIG. 10.

Referring to FIG. 11, the bulkhead 50 can support multiple horizontal rows of the fiber optic adapters 56. As depicted at FIG. 11, the bulkhead supports upper and lower horizontal rows of fiber optic adapters 56. In certain examples, the lower row of fiber optic adapters 56 corresponds to the lower tray 70 and the upper row of fiber optic adapters 56 corresponds to the upper tray 70U. It will be appreciated that during initial installation of the telecommunications device 20, the module 46 may include only one tray 70 and only one row of the fiber adapters 56. Later, the upper tray 70U as well as the upper row of fiber optic adapters 56 can be added to increase the capacity of the telecommunications device 20. In still other examples, both rows of the fiber optic adapters 56 can be provided during initial installation, and the upper tray 70U can be added at a later date to provide increased capacity and/or service upgrades.

Referring to FIG. 5, the housing 38 of the telecommunications device 20 includes a main housing body 90 having an open front 92, a rear housing base 94, opposite first and second sidewalls 96, 98 that project forwardly from the rear housing base 94, and opposite first and second housing end walls 100, 102 projecting forwardly from the rear housing base 94 that extend between the opposite first and second housing sidewalls 96, 98. The door 40 is pivotally attached to the main housing body 90 adjacent the open front 92 by at least one hinge 104. In the example shown, the hinge 104 extends along a length of the main housing body and is positioned at a forward edge of the second housing sidewall 98.

In certain examples, the first housing end wall 100 corresponds to the first region 52 of the housing interior 42 and the second housing end wall 102 corresponds to the second region 54 of the housing interior 42. The bulkhead 50 is located at an intermediate location along the lengths of the first and second housing sidewalls 96, 98. Thus, first portions of the first and second housing sidewalls 96, 98 correspond to the first region 52 of the housing interior 42 and second portions of the first and second housing sidewalls 96, 98 correspond to the second region 54 of the housing interior 42.

In certain examples, the second region 54 is configured to receive fiber optic cables from outside the housing 38. For example, the second housing end wall 102 defines a plurality of sealed cable access openings 106. The cable access openings 106 have open ends 108 at the open front 92 of the main housing body 90 for allowing fiber optic cables to be inserted within the cable access openings 106 when the door 40 is in the open position. The door 40 blocks the open ends 108 of the cable access openings 106 when the door 40 is in the closed position. The cable access openings 106 are sealed by one or more sealing elements. For example, a sealing gasket 110 is shown mounted along the second housing end wall 102. The gasket 110 can include slits corresponding to each of the cable access openings 106 for receiving fiber optic cables.

In certain examples, the gasket 110 can be captured between the second housing end wall 102 and a gasket retention wall 112 that extends between the first and second housing sidewalls 96, 98 and that is parallel to the second housing end wall 102.

Figure 8:
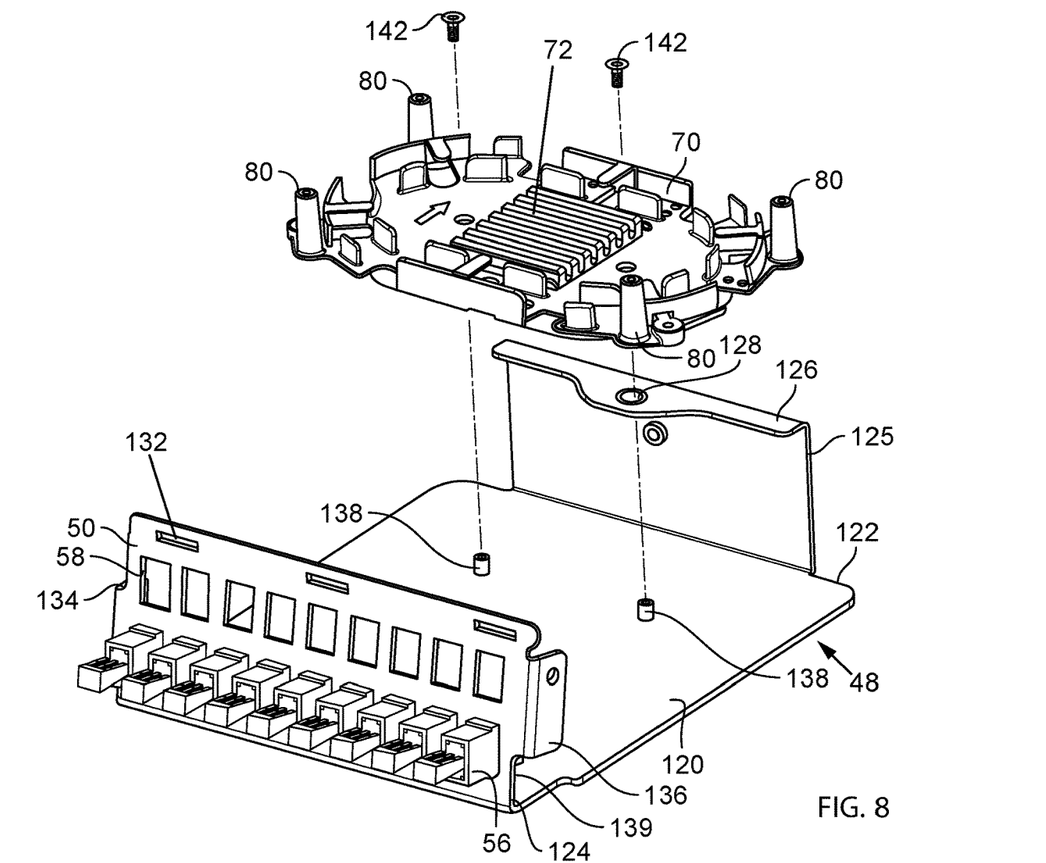
FIG. 8 shows the module of FIG. 7 with a fiber management tray exploded away from a module frame of the module.
Figure 9:
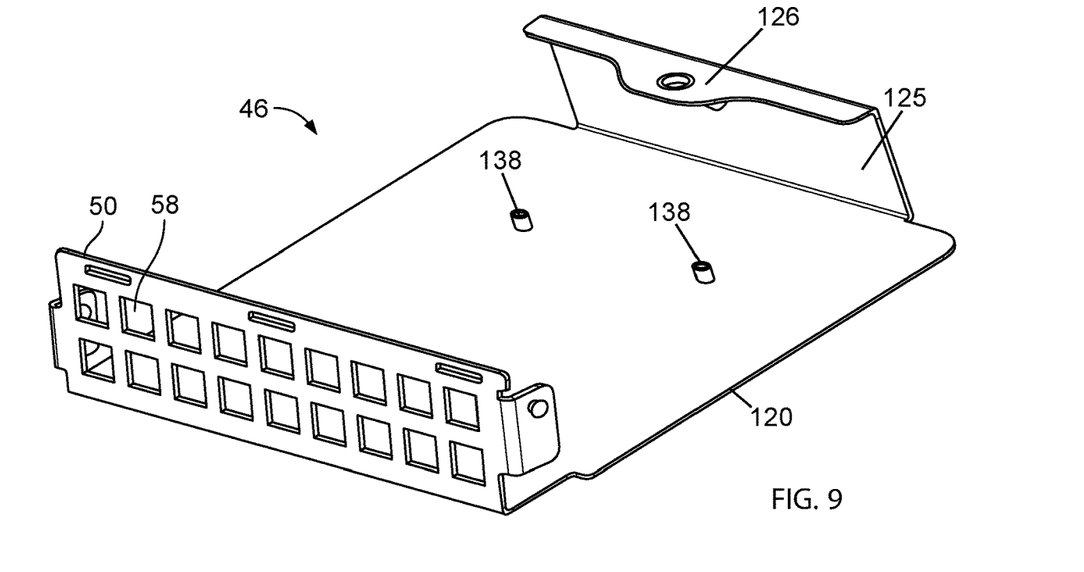
FIG. 9 illustrates the module frame of the module of FIG. 7.
Figure 10:
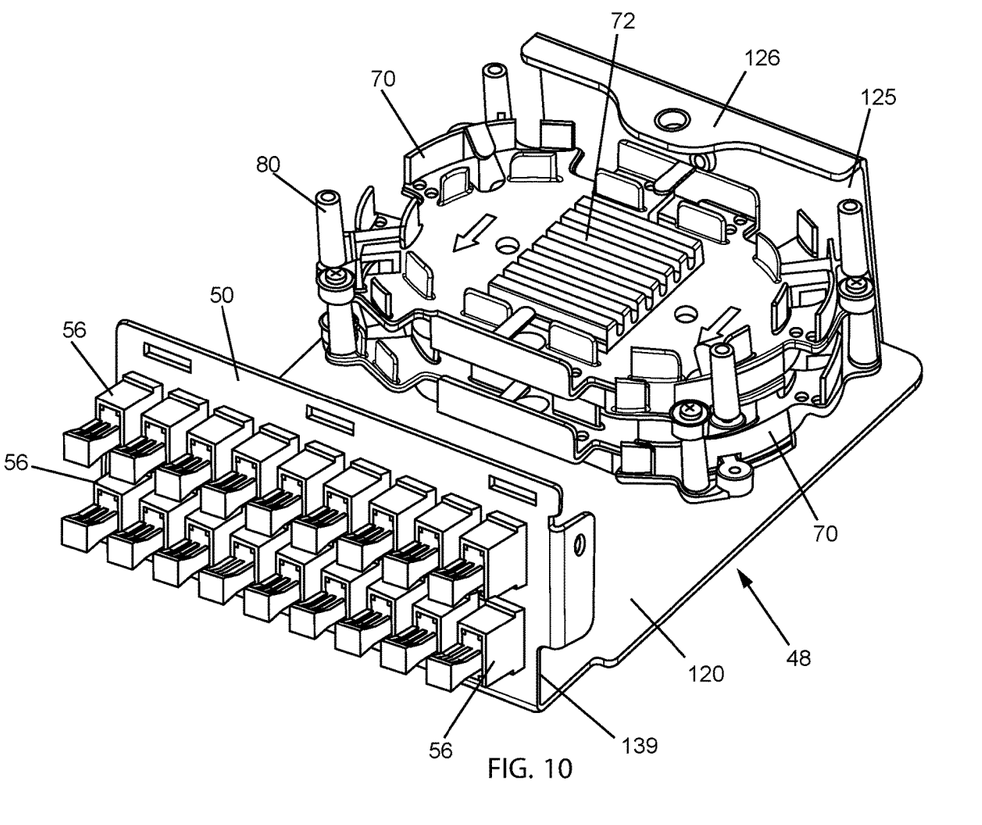
FIG. 10 illustrates the module of FIG. 7 with multiple fiber management trays stacked one-on-top of the other.

Referring to FIG. 8, the module frame 48 includes a module rear base 120 having first and second opposite ends 122, 124. The module frame 48 also includes a module end wall 125 that projects forwardly from the module rear base 120 at the first module end 122. The bulkhead 50 projects forwardly from the module rear base 120 at the second module end 124. A front flange 126 projects from a forward end of the module end wall 125. A cover catch 128 is provided on the front flange 126. A latch catch 69 of the removable cover 66 is configured to engage with the cover catch 128 to secure the removable cover 66 over a front side of the module frame 48. The removable cover 66 also includes a plurality of tabs 130 that are received within slots 132 (FIG. 7) defined by the bulkhead 50 of the module frame 48.

The bulkhead 50 includes first and second side tabs 134, 136 that are respectively fastened to the first and second housing sidewalls 96, 98 at intermediate locations between the first and second housing end walls 100, 102. Example fasteners can include rivets, screws, bolts or other structures. The module end wall can also be fastened to the first housing end wall 100 to secure the module frame 48 to the housing 38.

In certain examples, the housing can be environmentally sealed.

Figure 12:
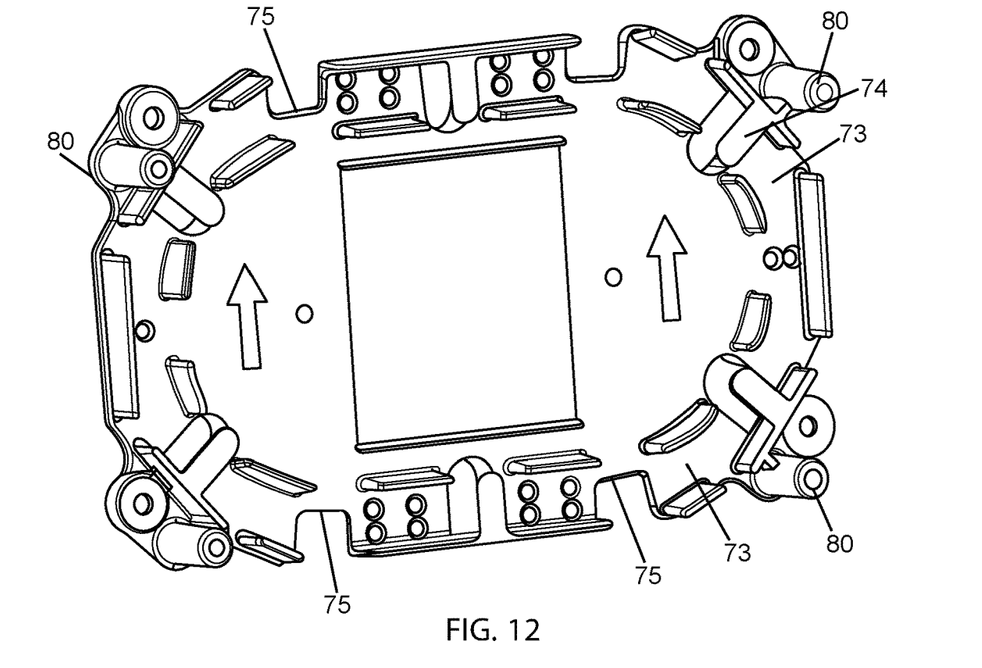
FIG. 12 is a top, perspective view of the fiber management tray depicted at FIGS. 7 and 8.
Figure 13:
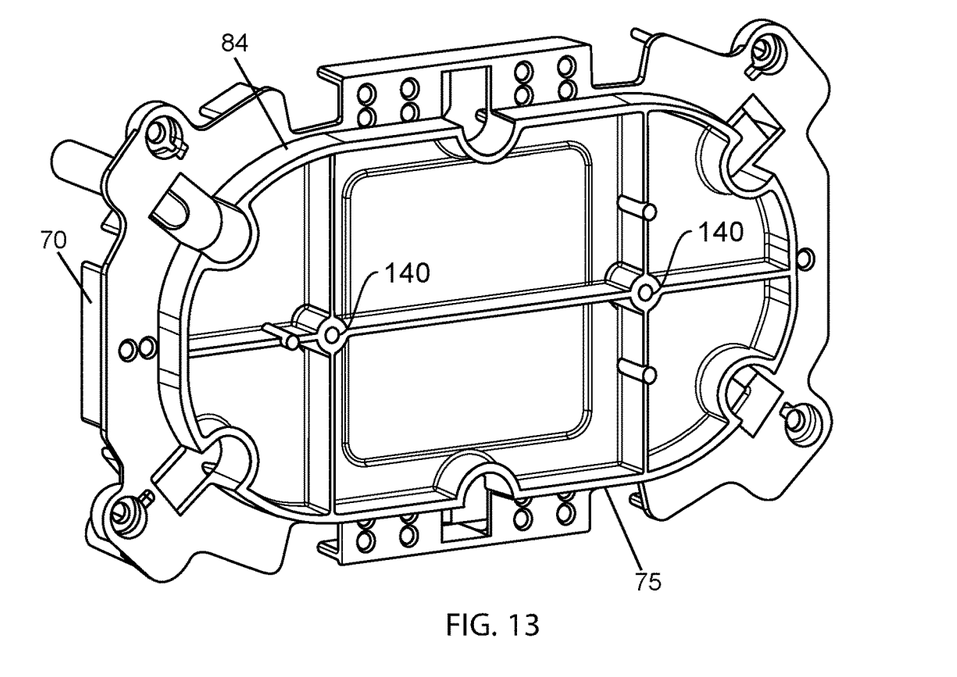
FIG. 13 is a bottom, perspective view of the fiber management tray of FIG. 12.

In certain examples, the tray 70 includes a front side for holding optical components and for storing optical fiber (see FIG. 12). The tray can also include a rear side defining a cable pathway about which a cable can be routed to provide strain relief (see FIG. 13). The front side of the tray can define one or more routing paths that define fiber storage loops.

In certain examples, the module frame 48 can include posts 138 that project forwardly from the module rear base 120. In certain examples, the tray 70 can include receptacles 140 that receive the posts 138 to mount the tray 70 at a predetermined location on the module frame 48. The fasteners 142 that engage the posts can be used to fix the tray 72 to the posts 138. In certain examples, the bulkhead includes one or more notches 139 for allowing cables to be passed through the bulkhead between the first region 52 and the second region 54 of the housing interior 42.

Figure 14:
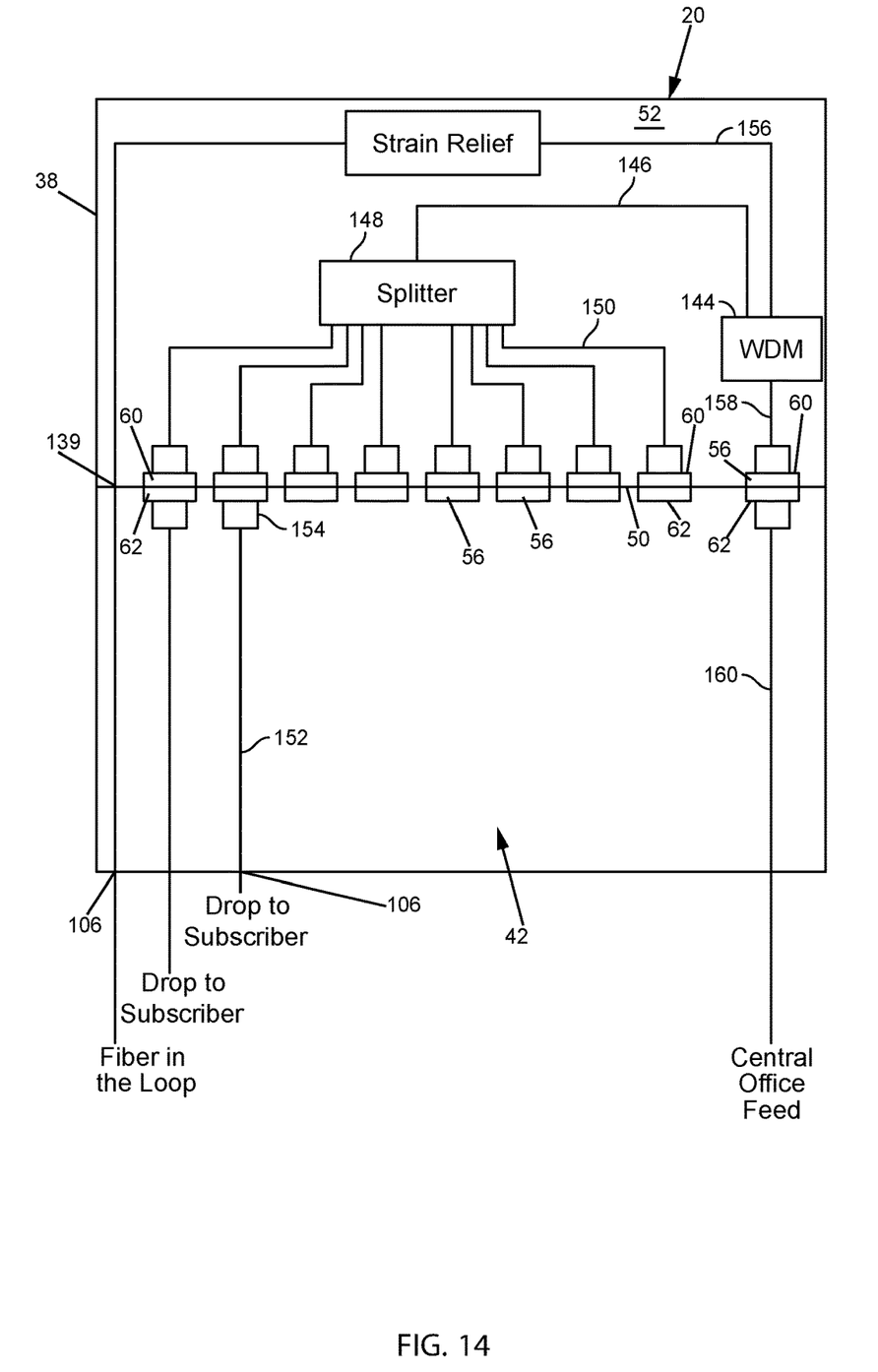
FIG. 14 is a schematic diagram showing an example fiber distribution architecture that can be incorporated into the telecommunications device of FIGS. 1-13.

FIG. 14 illustrates an example fiber optic architecture for the telecommunications device 20. Referring to FIG. 14, a wavelength division multiplexer 144 is positioned within the first region 52 of the housing interior 42. In certain examples, the wavelength division multiplexer 144 can be mounted to the module rear base 120, to the first or second housing sidewall 96, 98, or to the tray 70. A first output 146 of the wavelength division multiplexer 144 is coupled to an input side of a passive optical power splitter 148 provided at a front side of the tray 70. Connectorized outputs 150 of the passive optical power splitter 148 can be plugged into the first ports 60 of the fiber optic adapters 56. Subscriber cables 152 can be routed into the second region 54 of the housing interior 42 through the cable access openings 106. The subscriber cables 152 can have connectorized ends 154 that plug into the second ports 62 of the fiber optic adapters 56 to optically couple the subscriber cables 152 to the connectorized outputs 150 of the passive optical power splitter 148.

A second output 156 of the wavelength division multiplexer 144 can be routed out of the first region 52 of the housing interior 42 through one of the slots 139 in the bulkhead 50. The second output 156 can then be routed through the second region 54 of the housing interior 42 and routed out of the housing 38 through one of the cable access openings 106. In certain examples, the second output 156 can be optically connected to additional fiber in the loop. In certain examples, the second output 156 can be looped about the cable pathway provided on the rear side of the tray 70 prior to be routed out of the first region 52 of the housing interior 42. In this way, the tray functions to provide strain relief to the second output 156.

As depicted at FIG. 14, a connectorized pigtail 158 provides an input line to the wavelength division multiplexer 144. The connectorized pigtail 158 is plugged into the first port 60 of one of the fiber optic adapters 56. A connectorized feed fiber 160 that may be optically connected to a central office or other location is plugged into the second port 62 of the fiber optic adapter 56 to which the connectorized pigtail 58 is coupled. In this way, the connectorized feed fiber 160 is optically coupled to the input side of the wavelength division multiplexer 144.

The above specification, examples and data provide a complete description of the manufacture and use of the structure of the invention. Since many embodiments of the invention can be made without departing from the spirit and scope of the invention, the invention resides in the claims hereinafter appended.

What is claimed is:

1. A telecommunications device comprising:
   a housing including a rear wall and a peripheral sidewall extending forwardly from the rear wall, the peripheral sidewall defining an access opening leading to an interior of the housing, the peripheral sidewall defining a cable port, the interior including a termination region and a splice region;
   a door coupled to the housing, the door being movable between an open position and a closed position, the door covering the access opening when in the closed position, the door uncovering the access opening when in the open position;

a modular component that mounts to the rear wall of the housing within the interior of the housing, the modular component including a panel that extends forwardly from the rear wall of the housing at the termination region, the modular component also including a front flange that defines a first portion of a securement arrangement;

a plurality of optical adapters mounted to the panel of the modular component, each optical adapter defining a first port and a second port;

a splice tray disposed at the splice region of the interior of the housing; and a cover mounted within the interior of the housing, the cover extending over the splice region and over a portion of the interior extending between the splice region and the access opening to block access to the splice region and the portion of the interior, the cover also extending over a portion of the termination region to block access to the second ports of the optical adapters from the access opening, wherein the cover is positioned to expose the first ports of the optical adapters to the access opening, the cover including a second portion of a securement arrangement that engages the first portion of the securement arrangement at the front flange of the modular component to secure the cover to the housing, the cover being removable to expose the splice region and the first ports of the optical adapters to the access opening.

2. The telecommunications device of claim 1, wherein the panel extends fully across a width of the housing.

3. The telecommunications device of claim 1, wherein the splice tray also is mounted to the modular component.

4. The telecommunications device of claim 1, wherein the optical adapters are mounted to the panel in multiple rows.

5. The telecommunications device of claim 1, wherein the panel cooperates with the cover to define a restricted portion of the interior of the housing to which access is blocked.

6. The telecommunications device of claim 1, wherein the splice tray is disposed on a modular panel arrangement that mounts to the rear wall of the housing.

7. The telecommunications device of claim 1, wherein the first ports of the optical adapters face the cable port.

8. The telecommunications device of claim 1, wherein a fiber storage region is disposed within the interior of the housing.

9. The telecommunications device of claim 8, wherein the cover extends between the fiber storage region and the access opening.

10. The telecommunications device of claim 1, wherein the cover is substantially flat.

11. The telecommunications device of claim 1, further comprising a fastener holding the cover to the housing, wherein the first and second securement portions include fastener openings for receiving the fastener.

12. The telecommunications device of claim 1, wherein the peripheral wall includes a top section, a bottom section, and two side sections, the cable port being defined through the bottom section.

13. The telecommunications device of claim 12, wherein the cable port is one of a plurality of cable ports disposed at the bottom section.

14. The telecommunications device of claim 12, wherein the top section and two side sections are devoid of cable ports.

15. The telecommunications device of claim 1, further comprising an optical splitter disposed within the interior of the housing, the cover extending between the optical splitter and the access opening.

16. The telecommunications device of claim 1, further comprising a wave division multiplexer disposed within the interior of the housing, the cover extending between the wave division multiplexer and the access opening.

17. The telecommunications device of claim 1, wherein the splice tray is one of a plurality of splice trays disposed at the splice region.

* * * * *